(12) United States Patent
Liu

(10) Patent No.: US 7,929,436 B2
(45) Date of Patent: Apr. 19, 2011

(54) NETWORK COMMUNICATION CONTROL METHODS AND SYSTEMS

(75) Inventor: Yi-Li Liu, Taipei (TW)

(73) Assignee: Aten International Co., Ltd., Shijr (TW)

( * ) Notice: Subject to any disclaimer, the term of this patent is extended or adjusted under 35 U.S.C. 154(b) by 449 days.

(21) Appl. No.: 11/772,289

(22) Filed: Jul. 2, 2007

(65) Prior Publication Data

US 2009/0010155 A1      Jan. 8, 2009

(51) Int. Cl.
*G08C 15/00* (2006.01)

(52) U.S. Cl. ......... 370/230; 370/229; 370/232; 370/235

(58) Field of Classification Search .................. 370/230, 370/322, 376, 280, 347, 458, 468, 229, 232, 370/234, 235, 345
See application file for complete search history.

(56) References Cited

U.S. PATENT DOCUMENTS

| | | | |
|---|---|---|---|
| 5,657,323 A * | 8/1997 | Jan et al. | 370/252 |
| 6,031,827 A * | 2/2000 | Rikkinen et al. | 370/330 |
| 6,826,640 B1 | 11/2004 | Chang | |
| 6,912,231 B2 | 6/2005 | White et al. | |
| 7,146,312 B1 * | 12/2006 | Demetrescu et al. | 704/229 |
| 7,251,250 B2 * | 7/2007 | Boyd et al. | 370/442 |
| 7,342,911 B2 * | 3/2008 | Tolli et al. | 370/345 |
| 2003/0067897 A1 * | 4/2003 | Black | 370/335 |

FOREIGN PATENT DOCUMENTS

CN         1390016 A         1/2003

OTHER PUBLICATIONS

"LAN/WAN Bandwidth Control" Wayne Kawamoto, Jan. 2005.
"Cisco Bandwidth Control for Education Networks" Cisco Systems, 2006, pp. 1-17.
"Bandwidth Management in Radware's APSolute OS Architecture" Radware Inc., Jan. 2005, pp. 1-25.
Chinese Office Action, dated Apr. 29, 2010, in a counterpart Chinese patent application No. 200810124939.3. Concise Explanation of Relevance: the Chinese Office Action rejects claims in the Chinese application in view of Foreign Patent Document No. 1 above and U.S. Patent Application Publication No. 2003/0067897, cited by the examiner on Jul. 30, 2010.

* cited by examiner

*Primary Examiner* — Chi H Pham
*Assistant Examiner* — Weibin Huang
(74) *Attorney, Agent, or Firm* — Chen Yoshimura LLP

(57) ABSTRACT

Network communication control methods and systems are provided. The length of a sub-time slice is determined according to a network bandwidth, and a transmission threshold of the sub-time slice is determined according to the length of the sub-time slice and the network bandwidth. At least one network transmission is performed within the sub-time slice if a transmission amount of the network transmission within the sub-time slice does not exceed the transmission threshold.

21 Claims, 5 Drawing Sheets

NETWORK COMMUNICATION CONTROL METHODS AND SYSTEMS

BACKGROUND OF THE INVENTION

1. Field of the Invention

The disclosure relates generally to network management, and, more particularly to network communication control methods and systems with adjustable time slices.

2. Description of the Related Art

In packet switched networks, data is divided into small pieces called packets that can be processed. Generally, a network or a host using the network has a capacity limitation (bandwidth), defining a transmission threshold of data to be transmitted per second. Additionally, network transmission is time slice based. The network transmission is segmented into small time slices, each having a fixed length and a transmission threshold corresponding to the network bandwidth.

In time slice based network transmission, it is determined whether the transmission amount comprising a transmitted data amount within current time slice and a data amount requested to be transmitted exceeds the transmission threshold if a request of network transmission is received. If the transmission amount exceeds the transmission threshold, the request for network transmission is stopped. After the time slice, a new time slice begins, the transmission amount for the new time slice is reset to zero, and the request of network transmission is resumed to perform within the new time slice.

As described, the network transmission is segmented into time slices. Conventionally, a time slice has a fixed length of 1 second. In some cases, a system must wait for an incoming time slice if the transmission threshold of the current time slice is reached. For example, if the system reaches the transmission threshold in 100 ms, it must wait 900 ms for other network transmissions. This situation occurs especially when the network traffic is smooth, causing obviously transmission pause.

BRIEF SUMMARY OF THE INVENTION

Network communication control methods and systems are provided.

In a network communication control method, the length of a first time slice is determined according to a network bandwidth. A transmission threshold of the first time slice is determined according to the length of the first time slice and the network bandwidth. At least one network transmission is performed within the first time slice if a transmission amount of the network transmission within the first time slice does not exceed the transmission threshold.

In a network communication control method, a time slice is divided into at least one sub-time slice according to a network bandwidth. The length of each sub-time slice is determined according to the network bandwidth and the number of sub-time slices in the time slice, and a transmission threshold for each sub-time slice is determined according to the network bandwidth and the number of sub-time slices in the time slice. At least one network transmission is performed within each sub-time slice if a transmission amount of the network transmission within each sub-time slice does not exceed the transmission threshold.

A network communication control system comprises a network transmission control unit having a network bandwidth, and a processing unit. The processing unit determines the length of a sub-time slice according to the network bandwidth, and determines a transmission threshold of the sub-time slice according to the length of the sub-time slice and the network bandwidth. The processing unit determines whether a transmission amount of the network transmission within the sub-time slice exceeds the transmission threshold. The processing unit performs the network transmission within the sub-time slice via the network transmission unit if the transmission amount of the network transmission within the sub-time slice does not exceed the transmission threshold.

A network communication control system comprises a network transmission control unit and a processing unit. The network transmission control unit has a network bandwidth, and network transmissions thereon are performed based on time slices. The processing unit divides respective time slices into at least one sub-time slice according to the network bandwidth. The processing unit determines the length of each sub-time slice according to the network bandwidth and the number of sub-time slices in one time slice, and determines a transmission threshold for each sub-time slice according to the network bandwidth and the number of sub-time slices in one time slice. The processing unit determines whether a transmission amount of the network transmission within each sub-time slice exceeds the transmission threshold. The processing unit performs the network transmission within each sub-time slice if the transmission amount of the network transmission within each sub-time slice does not exceed the transmission threshold.

In a network communication control method, the length of a first time slice is determined according to a network bandwidth. A reception threshold of the first time slice is determined according to the length of the first time slice and the network bandwidth. At least one network reception is performed within the first time slice if a reception amount of the network reception within the first time slice does not exceed the reception threshold.

A network communication control system comprises a network reception control unit having a network bandwidth, and a processing unit. The processing unit determines the length of a sub-time slice according to the network bandwidth, and determines a reception threshold of the sub-time slice according to the length of the sub-time slice and the network bandwidth. The processing unit determines whether a reception amount of the network reception within the sub-time slice exceeds the reception threshold. The processing unit performs the network reception within the sub-time slice via the network reception unit if the reception amount of the network reception within the sub-time slice does not exceed the reception threshold.

Network communication control methods and systems may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Network communication control methods and systems are provided.

Figure 1:
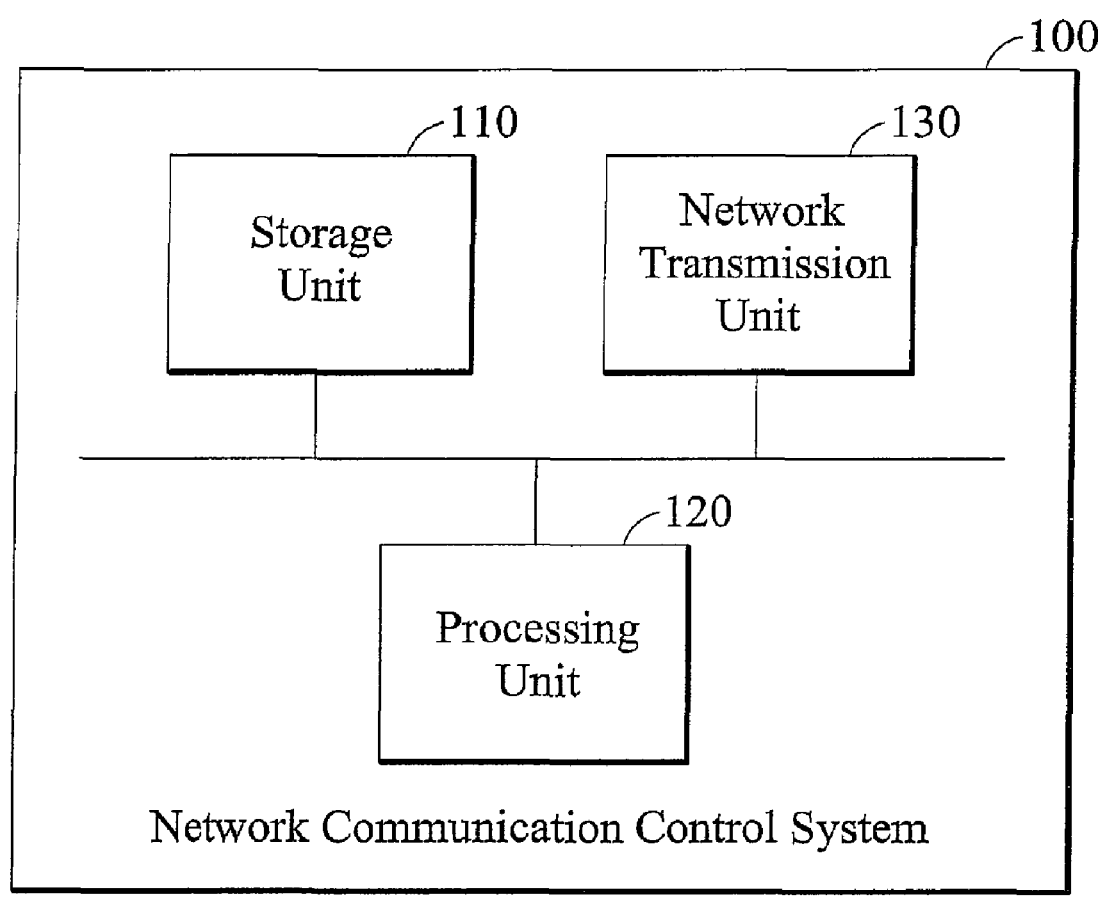
FIG. 1 is a schematic diagram illustrating an embodiment of a network communication control system.

FIG. 1 is a schematic diagram illustrating an embodiment of a network communication control system. In this embodiment, a time slice is divided into at least one sub-time slice according to network bandwidth.

The network communication control system 100 comprises at least one storage unit 110, at least one processing unit 120, and at least one network transmission unit 130. The storage unit 110 may be a flash memory or a SDRAM (Synchronous Dynamic Random Access Memory) storing related settings such as network bandwidth, length and transmission threshold of sub-time slice, transmission amount within sub-time slice, and others. The processing unit 120 performs the network transmission controls, discussed in detail later. The network transmission unit 130 may be a network interface card/circuit/chip (NIC) physically handling network transmission operations. The network transmission unit 130 is used for connecting to Network, such as Internet, Intranet, Local Area Network (LAN), Wide Area Network (WAN) or Wireless Network. It is understood that the network transmission unit 130 has a setting of network bandwidth. The network bandwidth may be set for an entire network connection or a host of the system using part of the network connection.

Figure 2:
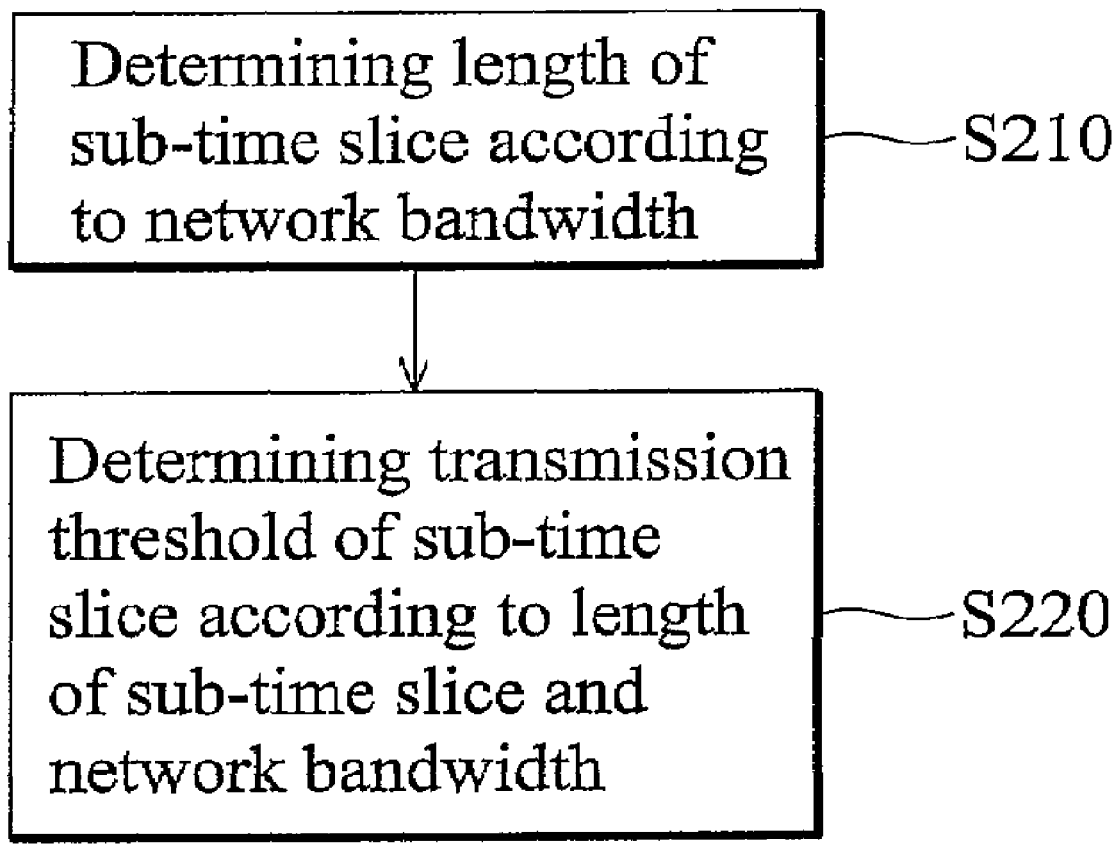
FIG. 2 is a flowchart of an embodiment of a network communication control method for determining the length and transmission threshold of sub-time slices.

FIG. 2 is a flowchart of an embodiment of a network communication control method for determining the length and transmission threshold of sub-time slices.

In step S210, the length of a sub-time slice is determined according to the network bandwidth. In step S220, a transmission threshold of the sub-time slice is determined according to the length of the sub-time slice and the network bandwidth. In some embodiments, the settings for respective sub-time slices are the same. It is noted that the processes of FIG. 2 are executed by the processing unit 120 of FIG. 1.

Figure 3:
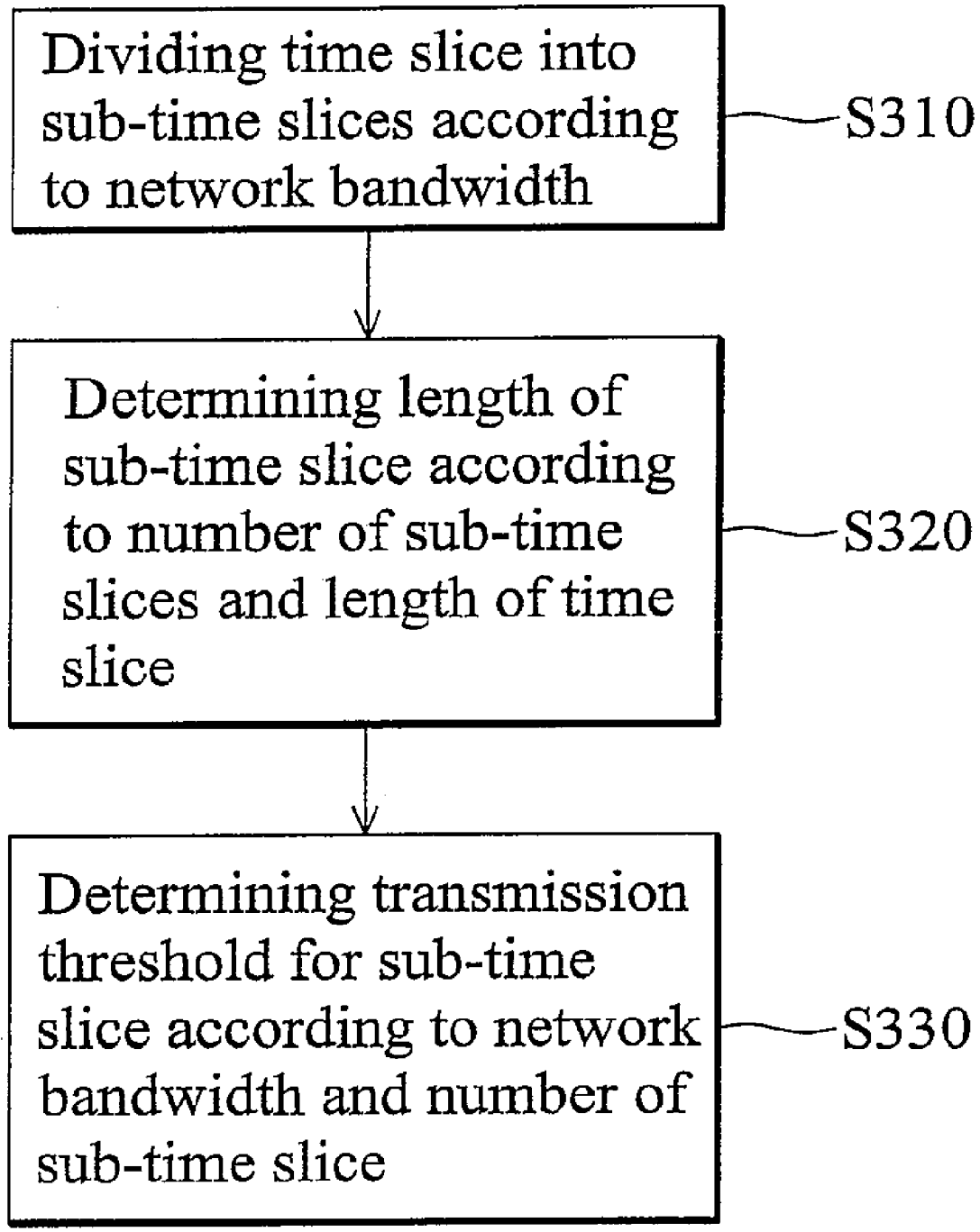
FIG. 3 is a flowchart of an embodiment of a network communication control method for determining the length and transmission threshold of sub-time slices.

FIG. 3 is a flowchart of an embodiment of a network communication control method for determining the length and transmission threshold of sub-time slices. In this embodiment, the conventional time slice is divided into at least one sub-time slice.

In step S310, the time slice is divided into at least one sub-time slice according to the network bandwidth. It is understood that the division manner may be various. In some embodiments, the number of the sub-time slices divided from a time slice may be more if the network bandwidth is large. In step S320, the length of a sub-time slice is determined according to the number of the sub-time slices and the length of the time slice. In some embodiments, the number of the sub-time slices divided from a time slice may be more, and the length of the sub-time slice may be the same or different if the network bandwidth is large. In step S330, a transmission threshold of the sub-time slice is determined according to the network bandwidth and the number of sub-time slices. In some embodiments, the length of the sub-time slice is determined as a specific fraction of 1 second (the length of conventional time slice) according to the network bandwidth, and the transmission threshold of the sub-time slice is determined as the specific fraction of the network bandwidth. It is noted that the processes of FIG. 3 are executed by the processing unit 120 of FIG. 1.

Figure 4:
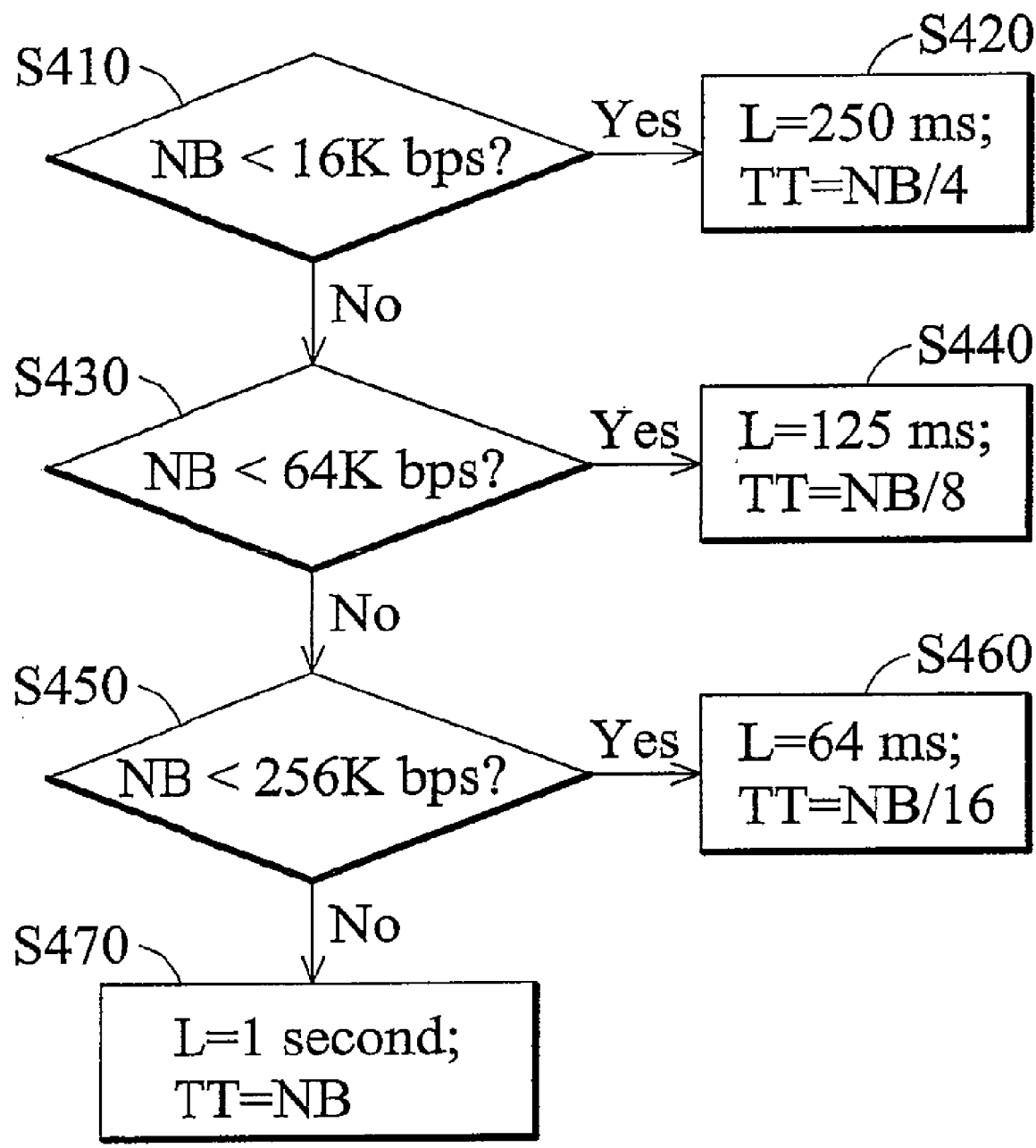
FIG. 4 is a flowchart of an embodiment determining the length and transmission threshold of sub-time slices.

FIG. 4 is a flowchart of an embodiment determining the length and transmission threshold of sub-time slices.

In step S410, it is determined whether the network bandwidth (NB) is less than a first default (such as 16 Kbps). If so (Yes in step S410), in step S420, the length (L) of the sub-time slice is determined as a first value (such as 250 ms (¼ of 1 second)), the number of sub-time slices is 4, and the transmission threshold (TT) of the sub-time slice is determined as ¼ of network bandwidth (NB). If not (No in step S410), in step S430, it is determined whether the network bandwidth (NB) is not less than the first default (such as 16 Kbps) and less than a second default (such as 64 Kbps) larger than the first default (such as 16 Kbps). If so (Yes in step S430), in step S440, the length (L) of the sub-time slice is determined as a second value (such as 125 ms (⅛ of 1 second)) smaller than the first value (such as 250 ms), the number of sub-time slices is 8, and the transmission threshold (TT) of the sub-time slice is determined as ⅛ of network bandwidth (NB). If not (No in step S430), in step S450, it is determined whether the network bandwidth (NB) is not less than the second default (such as 64 Kbps) and less than a third default (such as 256 Kbps) larger than the second default (such as 64 Kbps). If so (Yes in step S450), in step S460, the length (L) of the sub-time slice is determined as a third value (such as 64 ms (¹⁄₁₆ of 1 second)) smaller than the second value (such as 125 ms), the number of sub-time slices is 16, and the transmission threshold (TT) of the sub-time slice is determined as ¹⁄₁₆ of network bandwidth (NB). If not (No in step S450), in step S470, the length (L) of the sub-time slice is determined as a fourth value (such as 1 second) larger than the first value (such as 250 ms), and the transmission threshold (TT) of the sub-time slice is determined as the network bandwidth (NB). It is noted that the processes of FIG. 4 are executed by the processing unit 120 of FIG. 1.

Figure 5:
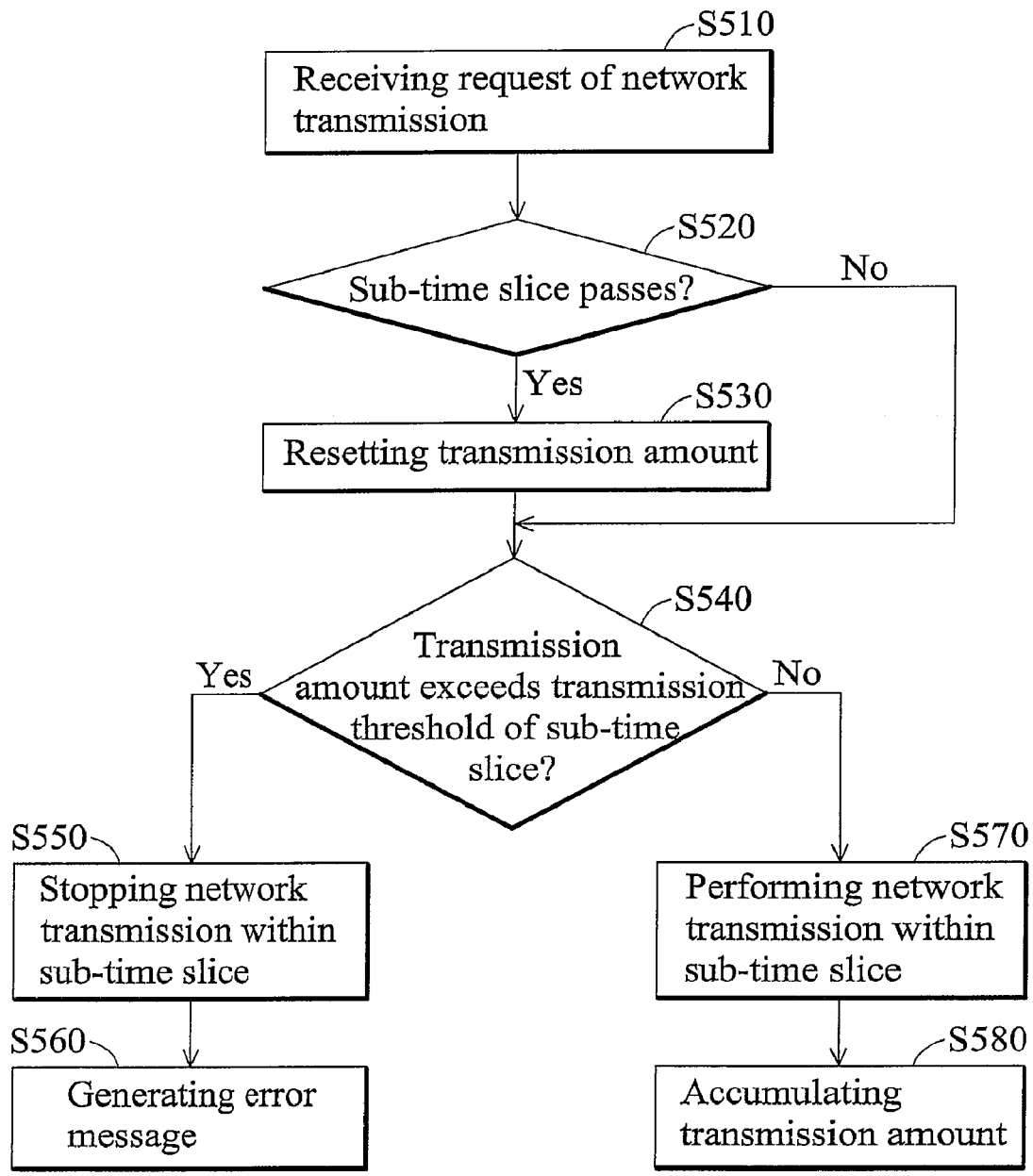
FIG. 5 is a flowchart of an embodiment of a network communication control method.

After the length and transmission threshold are determined, network communications may be performed accordingly. FIG. 5 is a flowchart of an embodiment of a network communication control method.

In step S510, a request for network transmission is received. In step S520, it is determined whether a sub-time slice passes. In some embodiments, once a sub-time slice begins, a beginning time of the sub-time slice is recorded, and it is determined whether a sub-time slice passed by determining whether a current system time minus the beginning time of the sub-time slice exceeds the length of the sub-time slice. If not, the procedure goes to step S540. If so, in step S530, the transmission amount is reset for the new/another/next sub-time slice. In some embodiments, the length and the transmission threshold of the new/another/next sub-time slice are the same as those of the sub-time slice. In step S540, it is determined whether the transmission amount exceeds the transmission threshold of the sub-time slice. In some embodiments, the transmission amount may comprise a transmitted data amount and a data amount to be transmitted of the current request. If the transmission amount exceeds the transmission threshold (Yes in step S540), in step S550, the network transmission is stopped within the sub-time slice, and in step S560, an error message is generated. It is noted that the network transmission can be resumed to perform if a new/another/next sub-time slice begins (since the transmission amount is reset). If the transmission amount does not exceed the transmission threshold (No in step S540), in step S570, the network transmission is performed within the sub-time slice, and in step S580, the transmission amount is accumulated with the data amount of the current request. In some embodiments, the transmission amount of the network transmission comprises a transmitted data amount and a data amount requested to be transmitted. It is noted that the processes of FIG. 5 are executed by the processing unit 120 of FIG. 1.

It is understood that network communication may comprise data transmission and reception. In some embodiments, the network communication for data reception can further be implemented. For example, if the length of a sub-time slice is determined according to the network bandwidth, and a reception threshold of the sub-time slice is determined according to the length of the sub-time slice and the network bandwidth, and a reception amount exceeds the reception threshold, the network reception is stopped. The network reception can be resumed if a new sub-time slice begins.

In the embodiments, the time slice is divided into sub-time slice with small lengths and transmission thresholds. Long transmission pauses such as those in conventional network transmission can be avoided. In some embodiments, the network communication control methods and systems may not only focus on server side, but also involve services. That is, a server may contain lots of services, with the abovementioned embodiments, network bandwidth for services can be limited.

Network communication control methods and systems, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A network communication control method performed by a processing unit of a network communication control system, comprising:
   determining the length of a sub-time slice according to a network bandwidth;
   determining a transmission threshold of the sub-time slice according to the length of the sub-time slice and the network bandwidth;
   performing at least one network transmission within the sub-time slice if a transmission amount of the network transmission within the sub-time slice does not exceed the transmission threshold;
   stopping the network transmission if the transmission amount of the network transmission within the sub-time slice exceeds the transmission threshold;
   determining whether the sub-time slice passed, and if so, performing the network transmission within another sub-time slice again, wherein the other sub-time slice begins after the sub-time slice; and
   resetting the transmission amount of the network transmission within the other sub-time slice.

2. The method of claim 1, further comprising:
   determining whether the sub-time slice has passed by determining whether a current system time minus a beginning time of the sub-time slice exceeds the length of the sub-time slice.

3. The method of claim 1, further comprising:
   generating an error message if the transmission amount of the network transmission within the sub-time slice exceeds the transmission threshold.

4. The method of claim 1, wherein the transmission amount of the network transmission comprises a transmitted data amount and a data amount requested to be transmitted.

5. The method of claim 1, further comprising:
   determining the length of the sub-time slice as a specific fraction of 1 second according to the network bandwidth.

6. The method of claim 5, further comprising:
   determining the transmission threshold of the sub-time slice as the specific fraction of the network bandwidth.

7. The method of claim 1, wherein the step of determining the length of a sub-time slice comprises:
   dividing a time slice into at least one sub-time slice according to the network bandwidth; and
   determining the length of the sub-time slice according to the number of the sub-time slices in the time slice and the length of the time slice.

8. The method of claim 7, wherein the step of determining a transmission threshold of the sub-time slice comprises:
   determining the transmission threshold of the sub-time slice according to the network bandwidth and the number of the sub-time slices in the time slice.

9. A network communication control method performed by a processing unit of a network communication control system, comprising:
   determining the length of a sub-time slice according to a network bandwidth;
   determining a transmission threshold of the sub-time slice according to the length of the sub-time slice and the network bandwidth; and
   performing at least one network transmission within the sub-time slice if a transmission amount of the network transmission within the sub-time slice does not exceed the transmission threshold;
   determining the length of the sub-time slice is a first value, and the transmission threshold of the sub-time slice is quarter of the network bandwidth if the network bandwidth is less then a first default; and
   determining the length of the sub-time slice is a second value smaller than the first value, and the transmission threshold of the sub-time slice is one eighth of the network bandwidth if the network bandwidth is not less than the first default and is less than a second default larger than the first default.

10. The method of claim 9, further comprising:
    determining the length of the sub-time slice is a third value smaller than the second value, and the transmission threshold of the sub-time slice is one sixteenth of the network bandwidth if the network bandwidth is not less than the second default and is less than a third default larger than the second default.

11. The method of claim 10, further comprising:
    determining the length of the sub-time slice is a fourth value larger than the first value, and the transmission threshold of the sub-time slice is the network bandwidth if the network bandwidth is not less than the third default.

12. A network communication control system, comprising:
a network transmission unit having a network bandwidth;
a processing unit determining a length of a sub-time slice according to the network bandwidth, determining a transmission threshold of the sub-time slice according to the length of the sub-time slice and the network bandwidth, and performing at least one network transmission within the sub-time slice via the network transmission unit if a transmission amount of the network transmission within the sub-time slice does not exceed the transmission threshold;
wherein the processing unit further stopping the network transmission if the transmission amount of the network transmission within the sub-time slice exceeds the transmission threshold;
wherein the processing unit further determines whether the sub-time slice has passed, and if so, performs the network transmission within another sub-time slice again, where the other sub-time slice begins after the sub-time slice; and
wherein the processing unit further resets the transmission amount of the network transmission within the other sub-time slice; and
a storage unit for storing at least one of the network bandwidth, the length of the sub-time slice, the transmission threshold of the sub-time slice, or the transmission amount of the network transmission.

13. The system of claim 12, wherein the processing unit further determines whether the sub-time slice has passed by determining whether a current system time minus a beginning time of the sub-time slice exceeds the length of the sub-time slice.

14. The system of claim 12, wherein the processing unit further generates an error message if the transmission amount of the network transmission within the sub-time slice exceeds the transmission threshold.

15. The system of claim 12, wherein the transmission amount of the network transmission comprises a transmitted data amount and a data amount requested to be transmitted.

16. The system of claim 12, wherein the processing unit further determines the length of the sub-time slice as a specific fraction of 1 second according to the network bandwidth.

17. The system of claim 16, wherein the processing unit further determines the transmission threshold of the sub-time slice as the specific fraction of the network bandwidth.

18. The system of claim 12, wherein the processing unit divides a time slice into at least one sub-time slice according to the network bandwidth, determines the length of the sub-time slice according to the number of the sub-time slices in the time slice and the length of the time slice, and determines the transmission threshold of the sub-time slice according to the network bandwidth and the number of the sub-time slices in the time slice.

19. A network communication control system, comprising:
a network transmission unit having a network bandwidth;
a processing unit determining a length of a sub-time slice according to the network bandwidth, determining a transmission threshold of the sub-time slice according to the length of the sub-time slice and the network bandwidth, and performing at least one network transmission within the sub-time slice via the network transmission unit if a transmission amount of the network transmission within the sub-time slice does not exceed the transmission threshold;
wherein the processing unit further determines the length of the sub-time slice is a first value, and the transmission threshold of the sub-time slice is quarter of the network bandwidth if the network bandwidth is less then a first default; and
wherein the processing unit further determines the length of the sub-time slice is a second value smaller than the first value, and the transmission threshold of the sub-time slice is one eighth of the network bandwidth if the network bandwidth is not less than the first default and is less than a second default larger than the first default; and
a storage unit for storing at least one of the network bandwidth, the length of the sub-time slice, the transmission threshold of the sub-time slice, or the transmission amount of the network transmission.

20. The system of claim 19, wherein the processing unit further determines the length of the sub-time slice is a third value smaller than the third value, and the transmission threshold of the sub-time slice is one sixteenth of the network bandwidth if the network bandwidth is not less than the second default and is less than a third default larger than the second default.

21. The system of claim 20, wherein the processing unit further determines the length of the sub-time slice is a fourth value larger than the first value, and the transmission threshold of the sub-time slice is the network bandwidth if the network bandwidth is not less than the third default.

* * * * *